United States Patent
Teichmann

(10) Patent No.: US 9,819,192 B2
(45) Date of Patent: Nov. 14, 2017

(54) SOLID OXIDE FUEL CELL-BASED POWER GENERATION AND DELIVERY SYSTEM AND METHOD OF OPERATING THE SAME

(71) Applicant: General Electric Company, Schenectady, NY (US)

(72) Inventor: Ralph Teichmann, Niskayuna, NY (US)

(73) Assignee: General Electric Company, Niskayuna, NY (US)

(*) Notice: Subject to any disclaimer, the term of this patent is extended or adjusted under 35 U.S.C. 154(b) by 601 days.

(21) Appl. No.: 14/445,696

(22) Filed: Jul. 29, 2014

(65) Prior Publication Data

US 2016/0036236 A1    Feb. 4, 2016

(51) Int. Cl.
    *H02J 1/12*    (2006.01)
    *H02J 3/00*    (2006.01)
    *H02J 3/38*    (2006.01)
    *H02J 4/00*    (2006.01)

(52) U.S. Cl.
    CPC ............... *H02J 3/387* (2013.01); *H02J 4/00* (2013.01); *H02J 2003/388* (2013.01); *Y02P 90/40* (2015.11)

(58) Field of Classification Search
    CPC ..................................... H02J 3/387; H02J 4/00
    USPC .......................................................... 307/25
    See application file for complete search history.

(56) References Cited

U.S. PATENT DOCUMENTS

| | | |
|---|---|---|
| 5,541,014 A | 7/1996 | Micheli et al. |
| 5,587,647 A | 12/1996 | Bansal et al. |
| 5,764,036 A | 6/1998 | Vaidya et al. |
| 6,230,494 B1 | 5/2001 | Botti et al. |
| 6,309,770 B1 | 10/2001 | Nagayasu et al. |
| 6,655,325 B1 | 12/2003 | Botti et al. |
| 6,868,677 B2 | 3/2005 | Viteri et al. |
| 6,883,328 B2 | 4/2005 | Bronicki |
| 6,921,595 B2 | 7/2005 | Clawson et al. |
| 7,118,606 B2 | 10/2006 | Labinov et al. |
| 7,118,818 B2 | 10/2006 | Agnew et al. |

(Continued)

FOREIGN PATENT DOCUMENTS

| | | |
|---|---|---|
| CN | 101640474 A | 2/2010 |
| EP | 2451041 A1 | 5/2012 |

(Continued)

OTHER PUBLICATIONS

"Catalog of CHP Technolgies", U.S. Environmental Protection Agency Combined Heat and Power Partnership, most notably the section entitled "Technology Characterization: Fuel Cells", beginning on p. 115 of 139, Dec. 2008.

(Continued)

*Primary Examiner* — Carlos Amaya

(74) *Attorney, Agent, or Firm* — Nitin N. Joshi

(57) ABSTRACT

A power system for an industrial facility includes a hybrid solid oxide fuel cell (HSOFC) system. The HSOFC system is coupled to at least one DC load and to at least one AC load. The at least one DC load defines a DC power demand value and the at least one AC load defines an AC power demand value. The DC power demand value and the AC power demand value define a power demand ratio. The HSOFC system is configured to generate DC power and generate AC power with a power generation ratio substantially complementary to the power demand ratio.

22 Claims, 2 Drawing Sheets

(56) References Cited

U.S. PATENT DOCUMENTS

Figure 1:
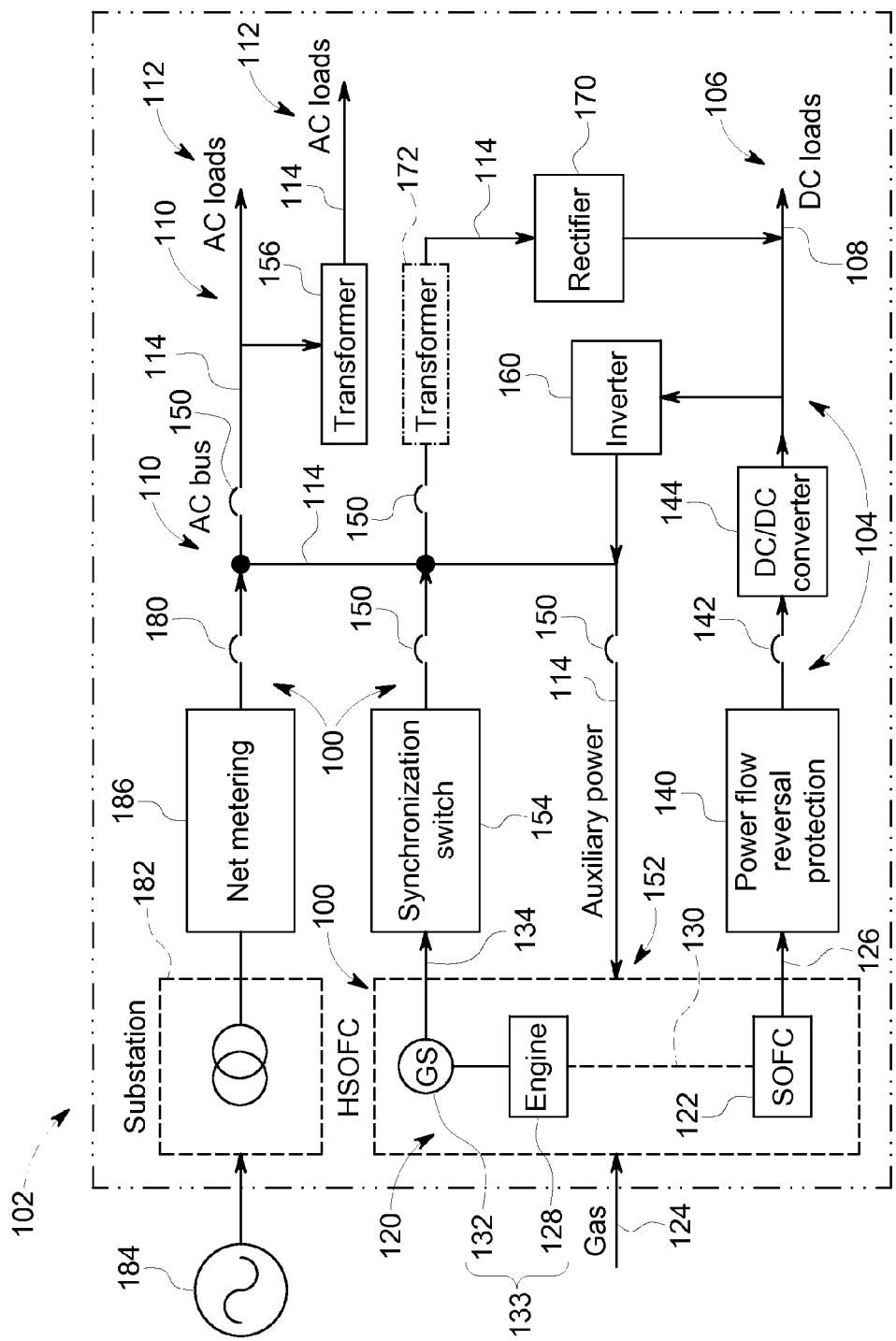

| | | |
|---|---|---|
| 7,306,871 B2 | 12/2007 | Grieve et al. |
| 7,326,482 B2 | 2/2008 | Haltiner, Jr. et al. |
| 7,503,948 B2 | 3/2009 | Hershkowitz et al. |
| 7,563,527 B2 | 7/2009 | Tanaka et al. |
| 7,709,118 B2 | 5/2010 | Lundberg |
| 7,833,668 B2 | 11/2010 | Ballantine et al. |
| 7,862,938 B2 | 1/2011 | Ghezel-Ayagh |
| 8,294,297 B2 | 10/2012 | Linkhart et al. |
| 8,525,492 B2 | 9/2013 | Peterson et al. |
| 2002/0163819 A1* | 11/2002 | Treece ............ F02B 43/10 363/34 |
| 2007/0268004 A1 | 11/2007 | Rozman et al. |
| 2011/0133703 A1 | 6/2011 | Rozman et al. |
| 2012/0251899 A1 | 10/2012 | Lehar et al. |

FOREIGN PATENT DOCUMENTS

| | | |
|---|---|---|
| GB | 2469043 A | 10/2010 |
| JP | 2003282118 A | 10/2003 |
| JP | 4367695 B2 | 11/2009 |
| WO | 0237587 A2 | 5/2002 |
| WO | 2012078055 A1 | 6/2012 |

OTHER PUBLICATIONS

European Search Report and Opinion issued in connection with corresponding EP Application No. 15177569.9 on Dec. 3, 2015.

\* cited by examiner

SOLID OXIDE FUEL CELL-BASED POWER GENERATION AND DELIVERY SYSTEM AND METHOD OF OPERATING THE SAME

BACKGROUND

The field of the disclosure relates generally to power generation systems, and, more particularly, to a solid oxide fuel cell-based power generation system and an associated power delivery system.

Fuel cells are electrochemical energy conversion devices that have demonstrated a potential for relatively high efficiency and low pollution in power generation. A fuel cell generally provides direct current (DC) power which may be converted to alternating current (AC) power through, e.g., an inverter. The DC power or AC power can be used to power motors, lights, and any number of electrical devices and systems. Certain fuel cells, such as solid oxide fuel cells (SOFCs), may operate in large-scale power systems that provide electricity to satisfy industrial and municipal needs.

A fuel cell produces electricity by electrochemically combining a fuel and an oxidant across an ionic conducting layer. Fuel cells are typically amassed in electrical series in an assembly of fuel cells to produce power at useful voltages or currents. In general, components of a fuel cell include the electrolyte and two electrodes, i.e., an anode and a cathode. The reactions that produce electricity generally take place at the electrodes. The electrolyte carries electrically charged particles from one electrode to the other. Typically, the fuel cells convert hydrogen (fuel) and oxygen (oxidant) into water (byproduct) to generate DC electric power. The water byproduct may exit the fuel cell as steam in high-temperature operations. This discharged steam (and other hot exhaust components) may be utilized in turbines and other applications to generate additional electric power, typically AC power, thereby providing increased efficiency of power generation.

In at least some known power generation systems for industrial facilities, all of the DC power is inverted into AC power and combined with AC power generated by the secondary power generation process. In addition, AC power from the power grid may be used either as a full-time support power source or an occasional backup power source. The combined AC power is then distributed throughout the industrial facility. For critical process applications requiring reliable sources of DC power, a portion of the combined AC power is typically converted to DC power through a multi-stage conversion process. This multi-stage conversion process often includes integrated uninterruptable power supply technology and DC voltage conditioning. Such multiple conversion stages increase system losses, reduce system reliability, and require extensive cooling provisions. Also, such installations require substantial capital expenditures for construction and operations and maintenance (O&M) expenditures for preventative and corrective maintenance.

BRIEF DESCRIPTION

In one aspect, a power system for an industrial facility is provided. The power system includes a hybrid solid oxide fuel cell (HSOFC) system coupled to at least one DC load and to at least one AC load. The at least one DC load defines a DC power demand value and the at least one AC load defines an AC power demand value. The DC power demand value and the AC power demand value define a power demand ratio. The HSOFC system is configured to generate DC power and generate AC power with a power generation ratio substantially complementary to the power demand ratio.

In a further aspect, a method of operating a power system for an industrial facility is provided. The power system includes a hybrid solid fuel oxide fuel cell (HSOFC) system configured to generate direct current (DC) power and generate alternating current (AC) power with a predetermined power generation ratio. The method includes transmitting a predetermined value of DC power to at least one DC load. The at least one DC load defines a DC power demand value. The method also includes transmitting a predetermined value of AC power to at least one AC load. The at least one AC load defines an AC power demand value. The DC power demand value and the AC power demand value define a power demand ratio. The method further includes generating DC power and AC power with the HSOFC system such that the power generation ratio is substantially complementary to the power demand ratio.

In another aspect, an industrial facility is provided. The industrial facility includes a direct current (DC) power system including coupled to at least one DC load and a DC conductor coupled to the at least one DC load. The at least one DC load defines a DC power demand value. The industrial facility also includes an alternating current (AC) power system coupled to at least one AC load and an AC conductor coupled to the at least one AC load. The at least one AC load defines an AC power demand value. The DC power demand value and the AC power demand value define a power demand ratio. The industrial facility further includes a hybrid solid oxide fuel cell (HSOFC) system coupled to at least one DC load and coupled to the at least one AC load. The HSOFC system is configured to generate DC power and generate AC power with a power generation ratio substantially complementary to the power demand ratio.

DRAWINGS

Figure 2:
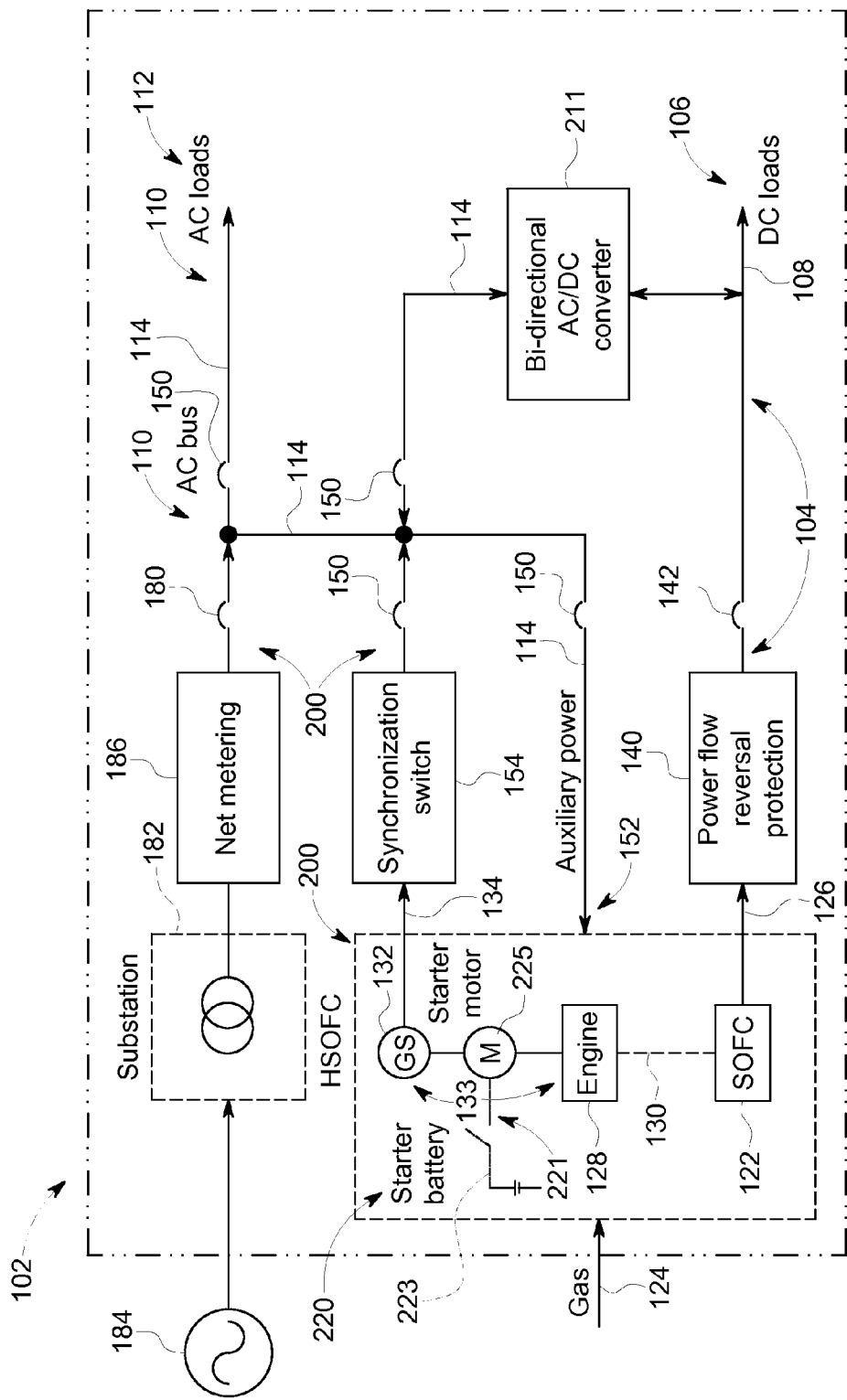

These and other features, aspects, and advantages of the present disclosure will become better understood when the following detailed description is read with reference to the accompanying drawings in which like characters represent like parts throughout the drawings, wherein:

FIG. 1 is a block diagram of an exemplary power system that may be used in an industrial facility; and FIG. 2 is a block diagram of an alternative power system that may be used in the industrial facility shown in FIG. 1.

Unless otherwise indicated, the drawings provided herein are meant to illustrate features of embodiments of this disclosure. These features are believed to be applicable in a wide variety of systems comprising one or more embodiments of this disclosure. As such, the drawings are not meant to include all conventional features known by those of ordinary skill in the art to be required for the practice of the embodiments disclosed herein.

DETAILED DESCRIPTION

In the following specification and the claims, reference will be made to a number of terms, which shall be defined to have the following meanings.

The singular forms "a", "an", and "the" include plural references unless the context clearly dictates otherwise.

"Optional" or "optionally" means that the subsequently described event or circumstance may or may not occur, and that the description includes instances where the event occurs and instances where it does not.

Approximating language, as used herein throughout the specification and claims, may be applied to modify any quantitative representation that could permissibly vary without resulting in a change in the basic function to which it is related. Accordingly, a value modified by a term or terms, such as "about", "approximately", and "substantially", are not to be limited to the precise value specified. In at least some instances, the approximating language may correspond to the precision of an instrument for measuring the value. Here and throughout the specification and claims, range limitations may be combined and/or interchanged, such ranges are identified and include all the sub-ranges contained therein unless context or language indicates otherwise.

The electric power generation systems described herein provide a cost-effective method for generating allocated portions of alternating current (AC) power and direct current (DC) power from a single, integrated power source. Specifically, the embodiments described herein include a dedicated AC power generation portion and a dedicated DC power generation portion. More specifically, the on-site, dedicated AC and DC dual power generation sources are complementary to, i.e., they are designed to substantially match the AC and DC load requirements, respectively, of an industrial facility, e.g., a data center. As such, the AC power and DC power are substantially independently regulated and distributed to the AC loads and DC loads, respectively. Also, the embodiments described herein, include a plurality of apparatus and methods for providing redundancy between the AC and DC systems to increase overall facility reliability and power balancing between the systems. Further, some of the embodiments described herein include black-start capabilities for both sources of power. In addition, the embodiments described herein significantly reduce the need for multi-stage intra-plant power conversion devices, reliance on off-site power, auxiliary power requirements, and the accompanying transmission & distribution losses.

FIG. 1 is a block diagram of an exemplary power system 100 that may be used in an exemplary industrial facility 102. In the exemplary embodiment, industrial facility is a data center. Alternatively, industrial facility 102 includes any industrial processes that enable operation of power system 100 as described herein. Power system 100 of industrial facility 102 includes a direct current (DC) electric power delivery system 104 that includes at least one DC conductor, i.e., bus 108. As such, DC power is transmitted to a plurality of DC loads 106 through at least one DC bus 108 coupled to at least a portion of plurality of DC loads 106. The sum of the values of the power draw of the plurality of DC loads 106 defines a DC power demand value that is any value that enables operation of industrial facility 102 as described herein. DC loads 106 include, without limitation, principle power for the data center apparatus (not shown), e.g., data servers and emergency lighting.

Power system 100 of industrial facility 102 also includes an alternating current (AC) electric power delivery system 110 coupled to a plurality of AC loads 112 through at least one AC conductor, i.e. bus 114. As such, AC power is transmitted to a plurality of AC loads 112 through at least one AC bus 114 coupled to at least a portion of plurality of AC loads 112. The sum of the values of the power draw of the plurality of AC loads 112 defines an AC power demand value that is any value that enables operation of industrial facility 102 as described herein. AC loads 112 include, without limitation, auxiliary equipment (not shown), e.g., facility lighting and cooling.

The DC power demand value and the AC power demand value define a power demand ratio that, in the exemplary embodiment, is approximately 70%-to-30%, respectively. As such, DC loads 106 are rated to consume approximately 70% of the total power draw of industrial facility 102 and AC loads 112 are rated to consume approximately 30% of the total power draw of industrial facility 102. The power demand ratio between DC and AC power demand is driven by the processes in industrial facility 102 and may fluctuate. For many processes, however, this power demand ratio remains substantially constant even as the total power demand tends to follow the process intensity. This demand characteristic is beneficial for a power generation system that can operate over a wide power range while generating AC and DC power with a similar ratio in a highly efficient way as does power system 100 as described herein.

Power system 100 includes a hybrid solid oxide fuel cell (HSOFC) system 120. HSOFC system 120 includes a solid oxide fuel cell (SOFC) system 122 that includes a sufficient number of connected fuel cells (not shown) that enables operation of HSOFC system 120 and power system 100 as described herein. Alternative embodiments include any other types of fuel cells that enable operation of HSOFC system 120 as described herein. SOFC system 122 receives a fuel stream 124 and generates and transmits a generated DC power 126, where power 126 is exclusively DC. Generated DC power 126 is primary supplied to DC loads 106. In the exemplary embodiment, fuel stream 124 is substantially natural gas. Alternatively, fuel stream 124 is any fuel that enables operation of SOFC system 122 as described herein including, without limitation, fuels that require pre-processing before they are supplied to SOFC 122. In addition, the value of generated DC power 126 defines a DC power generation value that is any value that enables operation of HSOFC system 120, power system 100, and industrial facility 102 as described herein. Variations of the DC power demand are met by adjusting the power production in SOFC 122.

HSOFC system 120 also includes a conventional thermal power generation device, i.e., a combustion engine 128 coupled in flow communication with SOFC system 122. In the exemplary embodiment, combustion engine 128 is a gas turbine engine, or any other gas engine that may use a portion of natural gas stream 124 as fuel to supplement the primary fuel supply (discussed further below). SOFC system 122 also generates a high-temperature working fluid stream 130 as a product of the electro-chemical process of the fuel cells. Fluid stream 130, which includes fuel from fuel stream 124 not used in SOFC 122, is fully or partially channeled to combustion engine 128 for combustion therein. Such combustion of the remainder of fuel stream 124 drives combustion engine 128 to generate mechanical power that drives a generator set 132. In some embodiments, HSOFC 120 also includes a fuel storage system between SOFC 122 and combustion engine 128 in order to decouple the temporary fuel needs required to serve transient changes in the AC and DC loads. As described above, combustion engine 128 is coupled to generator set 132 that generates and transmits a generated AC power 134, where power 134 is exclusively AC. In addition, the value of generated AC power 134 defines an AC power generation value that is any value that enables operation of HSOFC system 120, power system 100, and industrial facility 102 as described herein. Combustion engine 128 and generator set 132 define an engine-generator unit 133.

The DC power generation value and the AC power generation value define a power generation ratio that, in the exemplary embodiment, is approximately 70%-to-30%, respectively. As such, SOFC system 122 is rated to generate approximately 70% of the total generated power of HSOFC 120 and engine-generator unit 133 is rated to generate approximately 30% of the total generated power of HSOFC 120. In summary, in the exemplary embodiment, the power demand ratio and the power generation ratio both define approximately 30% AC power demand, approximately 30% AC power generation, approximately 70% DC power demand, and approximately 70% DC power generation for industrial facility 102. These steady-state power generation and power demand ratios, as well as proximate and adjacent values, e.g., and without limitation, a range of 25% to 35% and 65% to 75%, respectively, depending on the variety of designs of HSOFC 120, are generally preferred to maximize overall power plant efficiency and minimize inefficiencies. As such, the power generation ratio is substantially complementary to the power demand ratio.

In the exemplary embodiment, temporary deviations of the preferred power generation ratio are within the design intentions supported by independent fuel control for both SOFC 122 and combustion engine 133. Therefore, during AC and DC load demand transients, the changing plant power generation follows the power demand of the industrial process while attempting to keep the relationship of the power generation ratio and the power demand ratio substantially constant. More specifically, 30%±x % AC power demand facilitates having 30%±x % AC power generation, and 70%±y % DC power demand facilitates having 70%±y % having DC power generation for industrial facility 102.

In the exemplary embodiment, DC electric power delivery system 104 includes a power flow reversal protection system 140, at least one DC isolation device 142 (only one shown), and at least one DC-to-DC (DC/DC) converter 144 (only one shown). Power flow reversal protection system 140 is any system that substantially prevents transmission of DC power from DC electric power delivery system 104 to SOFC 122. DC isolation device 142 is any isolation device that effectively isolates SOFC 122 from DC bus 108 including, without limitation, a circuit breaker (with or without automatic protection features) and an isolation switch, both either remotely or locally operated. Some embodiments include DC/DC converter 144 for regulating the DC voltage on buses 108 and loads 106 downstream therefrom. Other embodiments include any device that enables operation of DC electric power delivery system 104 as described herein. Also, some embodiments include SOFC 122 with features to regulate the DC voltage generated therein such that downstream regulation devices are not necessary.

Also, in the exemplary embodiment, AC electric power delivery system 110 includes a plurality of AC isolation devices 150. AC electric power delivery system 110 also includes at least one auxiliary power system 152 that includes the necessary bus work and switchgear (neither shown) to facilitate operation of HSOFC system 120. AC electric power delivery system 110 further includes a synchronization switch 154 that synchronizes AC power 134 generated by engine-generator unit 133 with the AC power in the remainder of AC electric power delivery system 110 downstream of switch 154. Synchronization switch 154 is any device that enables operation of AC electric power delivery system 110 as described herein including, without limitation, a circuit breaker with automated synchronizing and protection features.

In some embodiments, AC electric power delivery system 110 also includes at least one load transformer 156 (only one shown) coupled to a portion of AC loads 112. Load transformer 156 facilitates operation of industrial facility 102 with a plurality of AV voltages, e.g., and without limitation, 110 single phase (1Ø) VAC, 208 1Ø VAC, and 440 three phase (3Ø) VAC.

In the exemplary embodiment, power system 100 includes at least one inverter 160 (only one shown) coupled to at least one DC bus 108 and at least one AC bus 110. Inverter 160 converts at least a portion of DC power in DC electric power delivery system 104 to AC power to supplement AC power delivery and AC voltage support in AC electric power delivery system 110 if combustion engine 128 and the grid (discussed further below) are inoperable. The presence of inverter 160 creates a triple redundant system for facilitating continued operation of industrial facilities 102 that include demanding processes with high electric power availability requirements.

Also, in some embodiments, power system 100 includes at least one rectifier 170 (only one shown) coupled to at least one DC bus 108 and at least one AC bus 110. Rectifier 170 converts at least a portion of AC power in AC electric power delivery system 110 to DC power to provide a redundant means to ensure DC power delivery and DC voltage support in DC electric power delivery system 104. Rectifier 170 is an optional device that provides another means to improve system availability by creating a dual redundant system on DC electric power delivery system 104. For some industrial load types, rectifier 170 may also support peak DC power demands which would shift HSOFC 120 temporarily out of its most efficient operating point. In some embodiments, a transformer 172 is coupled to rectifier 170 to transmit AC power at a predetermined voltage to rectifier 170 for conversion to DC power at the predetermined DC voltage.

Further, in the exemplary embodiment, power system 100 includes an AC grid circuit breaker 180 coupled to AC electric power delivery system 110. Industrial facility 102 includes a substation 182 coupled to an AC grid 184. Substation 182 includes the necessary equipment to enable operation of industrial facility 102 as described herein, including, without limitation, switchgear, transformers, and protective features. In some embodiments, industrial facility 102 also includes a net metering device 186. In the exemplary embodiment, AC power is imported from AC grid 184 only as necessary to support operation of industrial facility 102 if power system 100 needs supplemental AC and DC power not available from HSOFC system 120. Net metering device 186 facilitates notification to operators (not shown) of the value of power being imported, or previously imported, from AC grid 184. In some embodiments, AC grid circuit breaker 180 is normally open to isolate AC grid 14 from power system 100 and is only closed when supplemental power support is necessary. In other embodiments, AC grid circuit breaker 180 is normally closed.

In operation, HSOFC system 120 generates sufficient DC electric power 126 through SOFC system 122 to sufficiently power DC loads 106 through DC electric power delivery system 104. Similarly, and simultaneously, engine-generator unit 133 generates sufficient AC power 134 to sufficiently power AC loads 112 through AC electric power delivery system 110. As such, HSOFC system 120 substantially matches the process power needs of industrial facility 102 with the electricity being generated by type and capacity. Such matching is facilitated through regulating the power generated by HSOFC 120 as a function of existing, historical, and anticipated electric power demands of industrial facility 102. In the exemplary embodiment, the preferred operating point is approximately 70% of the total electric power demand of industrial facility 102 is DC and approximately 30% of the total electric power demand is AC. Therefore, approximately 70% of the total power generated by HSOFC system 120 is directly transmitted to DC electric power delivery system 104 and approximately 30% of the total power generated by HSOFC system 120 is directly transmitted to AC electric power delivery system 110. As such, in the exemplary embodiment, HSOFC system 120 is designed, constructed, and operated to substantially mirror the power needs of industrial facility 102 with little regulation of the power balance. HSOFC 120 is scalable and multiple HSPFC systems 120 are used for further scalability and redundancy. Therefore, and operating point for any industrial facility may be used to enable operation of electric system 100 therein as described in this disclosure.

In the event that a portion, or all of, one of DC electric power delivery system 104, AC electric power delivery system 110, and HSOFC system 120 needs to be removed from service, sufficient redundancies are provided through devices such as inverter 160, rectifier 170, and AC grid 184.

FIG. 2 is a block diagram of an alternative power system 200 that may be used in industrial facility 102. Power system 200 is similar to power system 100 with the following exceptions and is shown in FIG. 2 with some features not shown for clarity. Power system 200 includes at least one bi-directional AC/DC converter 211 (only one shown) coupled to at least one DC bus 108 and at least one AC bus 110. Bi-directional AC/DC converter 211 either supplements or is used in place of inverter 160 and rectifier 170 (both shown in FIG. 1). As such, bi-directional AC/DC converter 211 converts at least a portion of DC power in DC electric power delivery system 104 to AC power to supplement AC power delivery and AC voltage support in AC electric power delivery system 110. Also, bi-directional AC/DC converter 211 converts at least a portion of AC power in AC electric power delivery system 110 to DC power to supplement DC power delivery and DC voltage support in DC electric power delivery system 104.

In this alternative embodiment, an alternative HSOFC system 220 includes a black start system 221. Black start system 221 includes a battery starter system 223 that includes any equipment and features necessary to reliably facilitate a back start of engine-generator unit 133 including, without limitation, a battery charging and float system. Black start system also includes a start driver 225 coupled to battery starter system 223 and rotatably coupled to engine-generator unit 133. Start driver 225 is any device that enables a black start of engine-generator unit 133 when engine-generator unit 133 is a gas turbine engine including without limitation, an electric motor and a diesel engine. Alternative black start devices include, without limitation, momentum-type stored energy devices, solar collector systems, diesel-engine powered generators, and auxiliary steam boilers.

As used herein, the term "black start condition" refers to a condition when there are no electric power generators in service in the power generation facility and there are no other sources of immediately available electric power to facilitate a restart of at least one electric power generator therein. Also, as used herein, the term "black start" refers to the actions taken to use any backup power source to facilitate a start of a power generation device.

In operation, during black start conditions, i.e., stoppage of the electrolytic process in SOFC system 122, shutdown of engine-generator unit 133, and an unavailability of AC grid 184, battery starter system 223 energizes start driver 225. Start driver 225 rotates engine-generator unit 133 until sufficient air and fuel are entering the combustors (not shown) to facilitate ignition therein. Once engine-generator unit 133 is generating AC power 134 and auxiliary power system 152 is energized, SOFC 122 is restarted. Once SOFC 122 and engine-generator unit 133 are operating, AC loads 112 and DC loads 106 are restarted. Also, alternatively, SOFC 122 may be restarted first using devices such as smaller diesel-engine powered generators to provide the auxiliary power that is less than the rating for engine-generator unit 133. Once SOFC 122 is operating, high-temperature working fluid stream is used to restart engine-generator unit 133.

The above described electric power generation systems provide a cost-effective method for generating allocated portions of alternating current (AC) power and direct current (DC) power from a single, integrated power source. Specifically, the embodiments described herein include a dedicated AC power generation portion and a dedicated DC power generation portion. More specifically, the on-site, dedicated AC and DC dual power generation sources are complementary to, i.e., they are designed to substantially match the AC and DC load requirements, respectively, of an industrial facility, e.g., a data center. As such, the AC power and DC power are substantially independently regulated and distributed to the AC loads and DC loads, respectively. This is especially valuable for industrial processes which have a substantial DC load and a substantial AC load and have load dynamics in which the AC load and DC load generally follow a similar consumption profile. Also, the embodiments described herein, include a plurality of apparatus and methods for providing redundancy between the AC and DC systems to increase overall facility reliability and power balancing between the systems. Further, some of the embodiments described herein include black-start capabilities for both sources of power. In addition, the embodiments described herein significantly reduce the need for multi-stage intra-plant power conversion devices, reliance on off-site power, auxiliary power requirements, and the accompanying transmission & distribution losses. Furthermore, the arrangement of the HSOFC as described herein with effective utilization of the source energy permits power generation with one of the highest efficiencies and low emissions known today.

An exemplary technical effect of the methods, systems, and apparatus described herein includes at least one of: (a) increasing the reliability of independent AC and DC power sources in industrial facilities; (b) decreasing a physical footprint of electric power systems in industrial facilities; (c) facilitating variances and transients in each of the AC and DC systems from a target operating point through some interconnectivity; (d) providing electric power with a hybrid solid oxide fuel cell (HSOFC) system that increases supply-independence, availability, efficiency, reliability, and decreases emissions over that of conventional power generation systems; and (e) providing scalability and modularity through multiple HSOFC systems.

Exemplary embodiments of methods, systems, and apparatus for generating independent dual electric power generation are not limited to the specific embodiments described herein, but rather, components of systems and/or steps of the methods may be utilized independently and separately from other components and/or steps described herein. For example, the methods may also be used in combination with other non-conventional power generation systems requiring high reliability and small physical footprints, and are not limited to practice with only the systems and methods as described herein. Rather, the exemplary embodiment can be implemented and utilized in connection with many other applications, equipment, and systems that may benefit from reliable on-site electric power with AC and DC power generated to suit tailored load requirements.

Although specific features of various embodiments of the disclosure may be shown in some drawings and not in others, this is for convenience only. In accordance with the principles of the disclosure, any feature of a drawing may be referenced and/or claimed in combination with any feature of any other drawing.

This written description uses examples to disclose the embodiments, including the best mode, and also to enable any person skilled in the art to practice the embodiments, including making and using any devices or systems and performing any incorporated methods. The patentable scope of the disclosure is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

What is claimed is:

1. A power system for an industrial facility, said power system comprising a hybrid solid oxide fuel cell (HSOFC) system coupled to at least one DC load and to at least one AC load, wherein the at least one DC load defines a DC power demand value and the at least one AC load defines an AC power demand value, the DC power demand value and the AC power demand value define a power demand ratio, said HSOFC system configured to generate DC power and generate AC power with a power generation ratio substantially complementary to the power demand ratio.

2. The power system in accordance with claim 1, wherein the power demand ratio and the power generation ratio both define approximately 30% AC power demand, approximately 30% AC power generation, approximately 70% DC power demand, and approximately 70% DC power generation.

3. The power system in accordance with claim 1, wherein said HSOFC system comprises:
   a SOFC system; and
   an engine-generator unit coupled in flow communication with said SOFC system.

4. The power system in accordance with claim 3, wherein said SOFC system is configured to generate DC power exclusively and said engine-generator unit is configured to generate AC power exclusively.

5. The power system in accordance with claim 4 further comprising a DC/DC converter coupled to said SOFC system and to the at least one DC load.

6. The power system in accordance with claim 1 further comprising:
   a DC conductor coupled to the at least one DC load; and
   an AC conductor coupled to the at least one AC load.

7. The power system in accordance with claim 1 further comprising at least one of:
   an inverter coupled to said DC conductor and to said AC conductor, said inverter configured to convert at least a portion of the DC power to AC power;
   an AC power grid circuit breaker coupled to said AC conductor and an AC power grid, said AC power grid circuit breaker configured to facilitate supplementing the AC power with AC grid power;
   a transformer coupled to a portion of said AC conductor;
   a rectifier coupled to said AC conductor and to said DC conductor, said rectifier configured to convert at least a portion of the AC power to DC power; and
   a bi-directional AC/DC converter configured to convert at least a portion of the AC power to DC power and convert at least a portion of the DC power to AC power.

8. The power system in accordance with claim 1, wherein said HSOFC system comprises:
   an engine-generator unit; and
   a black start system comprising a starter battery and a start driver coupled to said engine-generator unit.

9. The power system in accordance with claim 8, wherein:
   said engine-generator unit is a gas turbine engine; and
   said start driver is one of an electric motor and a diesel engine.

10. A method of operating a power system for an industrial facility, the power system including a hybrid solid fuel oxide fuel cell (HSOFC) system configured to generate direct current (DC) power and generate alternating current (AC) power with a predetermined power generation ratio, said method comprising:
    transmitting a predetermined value of DC power to at least one DC load, wherein the at least one DC load defines a DC power demand value;
    transmitting a predetermined value of AC power to at least one AC load, wherein the at least one AC load defines an AC power demand value, the DC power demand value and the AC power demand value define a power demand ratio; and
    generating DC power and AC power with the HSOFC system such that the power generation ratio is substantially complementary to the power demand ratio.

11. The method in accordance with claim 10, wherein generating DC power and AC power with the HSOFC system comprises substantially maintaining the power demand ratio and the power generation ratio at approximately 30% AC power demand, approximately 30% AC power generation, approximately 70% DC power demand, and approximately 70% DC power generation.

12. The method in accordance with claim 10, wherein the HSOFC system includes a SOFC system and a engine-generator unit, and wherein generating DC power and AC power with the HSOFC system comprises generating DC power exclusively with the SOFC system and generating AC power exclusively with the engine-generator unit.

13. The method in accordance with claim 12 further comprising regulating DC voltage on a DC conductor coupled to the at least one DC load through at least one of:
    energizing a DC/DC converter downstream of the SOFC system and upstream of the at least one DC load;
    transmitting AC power from an AC conductor coupled to the engine-generator unit and the at least one AC load through at least one rectifier to the DC conductor; and
    transmitting AC power from the AC conductor coupled to the engine-generator unit and the at least one AC load through a bi-directional AC/DC converter to the DC conductor.

14. The method in accordance with claim 12 further comprising regulating AC voltage on an AC conductor coupled to the at least one AC load through at least one of:
    energizing a transformer downstream of the engine-generator unit and upstream of the at least one AC load;
    transmitting DC power from a DC conductor coupled to the SOFC system and the at least one DC load through an inverter to the AC conductor;
    closing an AC power grid circuit breaker to couple an AC power grid to the AC conductor; and
    transmitting DC power from a DC conductor coupled to the SOFC system and the at least one DC load through a bi-directional AC/DC converter to the AC conductor.

15. The method in accordance with claim 10, wherein the HSOFC system includes an engine-generator unit, said method further comprising performing a black start with the engine-generator unit.

16. The method in accordance with claim 15, wherein performing a black start with the engine-generator unit comprises at least one of:
coupling a starter battery to an electric motor rotatably coupled to the engine-generator unit; and
coupling the starter battery to a diesel engine rotatably coupled to the engine-generator unit.

17. An industrial facility comprising:
a direct current (DC) power system coupled to at least one DC load and a DC conductor coupled to the at least one DC load, wherein the at least one DC load defines a DC power demand value;
an alternating current (AC) power system coupled to at least one AC load and an AC conductor coupled to the at least one AC load, wherein the at least one AC load defines an AC power demand value, the DC power demand value and the AC power demand value define a power demand ratio; and
a hybrid solid oxide fuel cell (HSOFC) system coupled to the at least one DC load and to the at least one AC load, said HSOFC system configured to generate DC power and generate AC power with a power generation ratio substantially complementary to the power demand ratio.

18. The industrial facility in accordance with claim 17, wherein the power demand ratio and the power generation ratio both define approximately 30% AC power demand, approximately 30% AC power generation, approximately 70% DC power demand, and approximately 70% DC power generation.

19. The industrial facility in accordance with claim 17, wherein said HSOFC system comprises:
a SOFC system configured to generate DC power exclusively; and
an engine-generator unit coupled in flow communication with said SOFC system, said engine-generator unit configured to generate AC power exclusively.

20. The industrial facility in accordance with claim 17 further comprising at least one of:
a DC/DC converter coupled to said SOFC system and to the at least one DC load;
an inverter coupled to said DC conductor and to said AC conductor, said inverter configured to convert at least a portion of the DC power to AC power;
an AC power grid circuit breaker coupled to said AC conductor and an AC power grid, the AC power grid circuit breaker configured to facilitate supplementing the AC power with AC grid power;
a transformer coupled to said AC conductor;
a rectifier coupled to said AC conductor and coupled to said DC conductor, said rectifier configured to convert at least a portion of the AC power to DC power; and
a bi-directional AC/DC converter configured to convert at least a portion of the AC power to DC power and convert at least a portion of the DC power to AC power.

21. The industrial facility in accordance with claim 17 wherein said HSOFC system comprises:
a engine-generator unit; and
a black start system comprising a starter battery and a start driver coupled to said engine-generator unit.

22. The industrial facility in accordance with claim 21, wherein:
said engine-generator unit is a gas turbine engine; and
said start driver is one of an electric motor and a diesel engine.

* * * * *